E. POSSON.
COMPOUND HAND BRAKE MECHANISM.
APPLICATION FILED NOV. 25, 1918.

1,399,075.

Patented Dec. 6, 1921.
3 SHEETS—SHEET 1.

INVENTOR:
Edward Posson
BY
Sheridan, Jones, Sheridan and Smith, ATT'YS

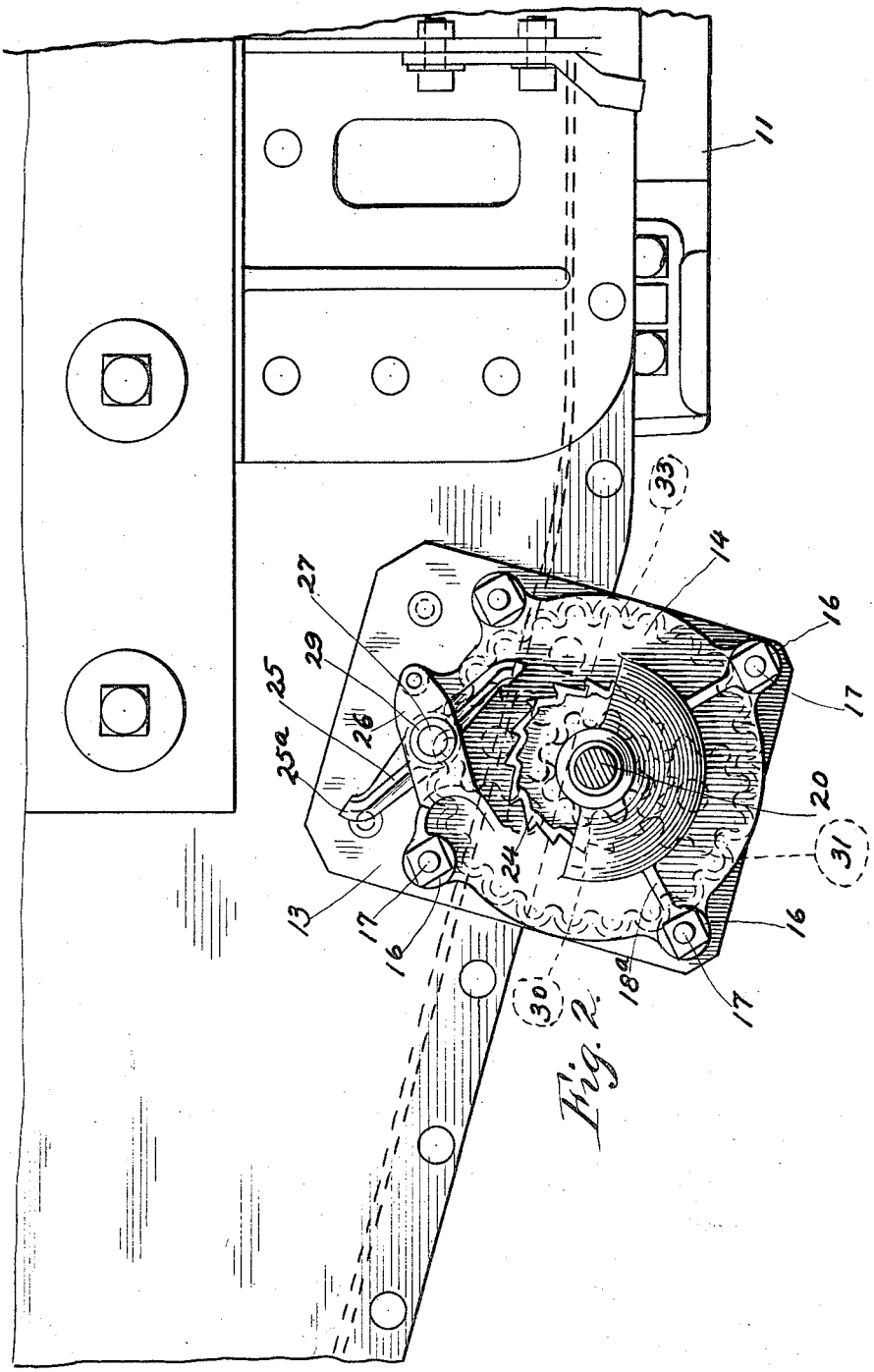

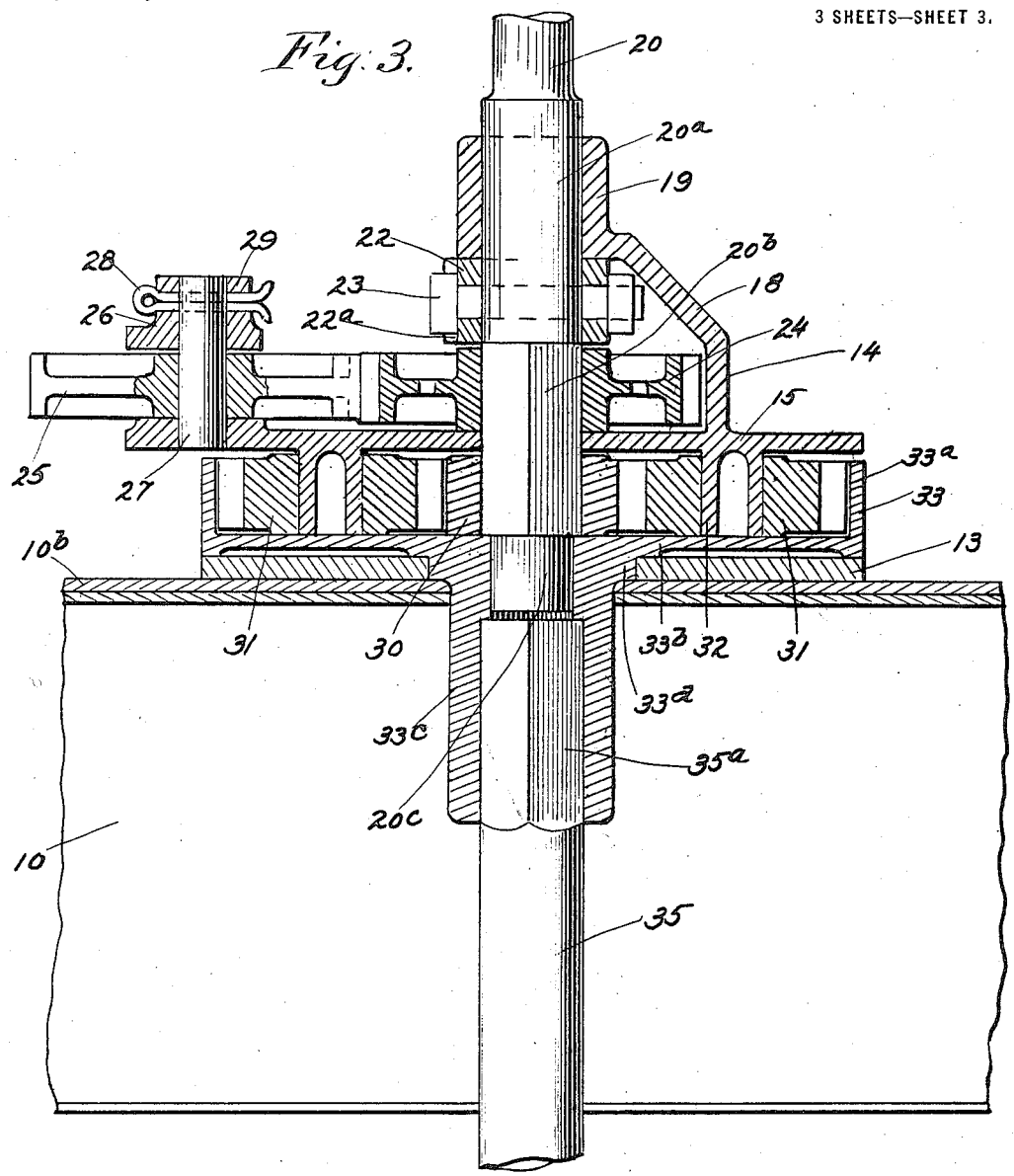

UNITED STATES PATENT OFFICE.

EDWARD POSSON, OF CHICAGO, ILLINOIS.

COMPOUND HAND-BRAKE MECHANISM.

1,399,075.  Specification of Letters Patent.  Patented Dec. 6, 1921.

Application filed November 25, 1918. Serial No. 263,999.

*To all whom it may concern:*

Be it known that I, EDWARD POSSON, a citizen of the United States, residing at Chicago, in the county of Cook and State of Illinois, have invented certain new and useful Improvements in Compound Hand-Brake Mechanism, of which the following is a specification.

This invention relates to compound hand brake mechanism for use in operating the brakes of railway cars, and the purpose is to provide means whereby the brakes may be operated more efficiently and with a less expenditure of power. The principal object of the invention is to provide hand brake mechanism comprising means for multiplying the power which is applied to the manually operated member. A further object is to provide a brake mast formed in two sections which are operatively connected by improved power transmitting mechanism. A further object is to provide an improved gearing mechanism between the manually operated brake mast and the shaft upon which the chain or other braking operating element is wound. Still another object is to provide improved means for mounting the intermediate gearing mechanism. Other objects relate to various features of construction and arrangement which will be pointed out more fully hereinafter.

The nature of the invention will be understood from the following specification taken with the accompanying drawings in which one embodiment of the invention is illustrated.

In the drawings—

Fig. 2 shows a top plan view of the end sill of the car and of the brake mechanism supported thereon; the upper portion of the brake mast and connected parts being removed;

Fig. 3 shows a vertical sectional view through the intermediate gearing device of the brake mechanism, taken on the line 3—3 of Fig. 2.

Figure 1:
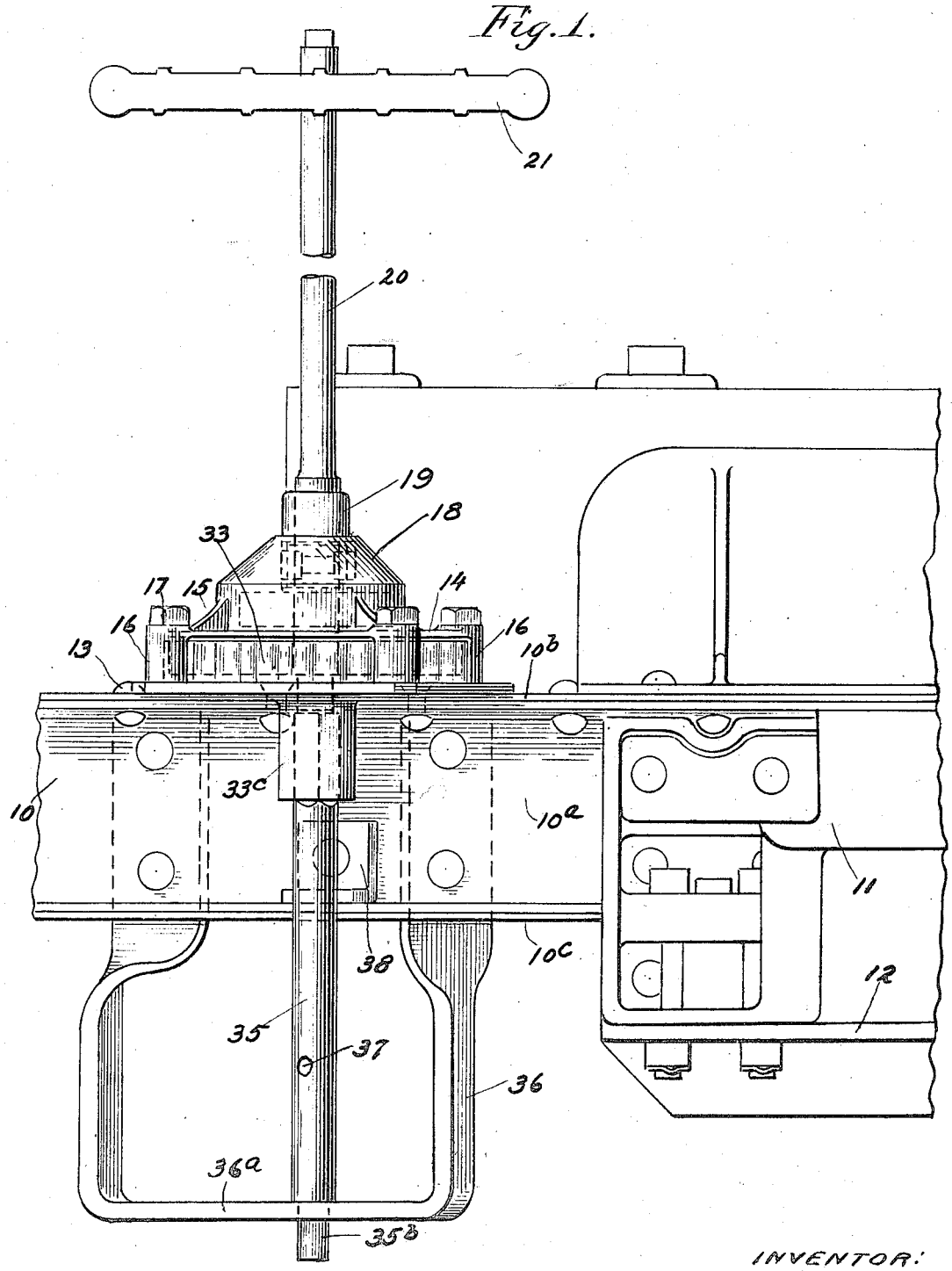
Figure 1 shows an end elevation of a portion of a railway car with my improved brake mechanism applied thereto.

In the drawings, the improved brake mechanism is shown applied to a railway car having an end sill 10 which comprises the channel-beam 10ª and upper and lower plates 10ᵇ and 10ᶜ, respectively. A metal dead-block or buffer plate 11 is attached to the central portion of the end sill and carries a draw-bar carrier 12. These parts and other associated features of the car construction may vary in design and are illustrated merely as a basis for explaining the construction and application of the present invention.

The improved brake mechanism comprises a supporting plate 13 which is seated upon the upper plate 10ᵇ of the end sill and riveted or bolted thereto with a portion thereof projecting longitudinally of the car beyond the end sill, as illustrated in Fig. 2. A housing or frame member 14 is mounted above the plate 13, being formed with a horizontal plate 15 having four downwardly extending lugs or posts 16 which rest upon the plate 13. The lugs 16 are apertured, and bolts 17 extend therethrough and through the plate 13 for securing the housing in rigid position with respect to the end sill and the supporting plate. The housing 14 has an upwardly extending bracket 18 formed integrally therewith, and this bracket carries at its upper end a bearing 19 which serves as a journal for the cylindrical portion 20ª of the upper brake mast 20. The bracket 18 is semi-circular in form, as illustrated in Fig. 2, and is reinforced by outwardly extending ribs 18ª. The brake mast 20 carries at its upper end the usual hand wheel 21, and the cylindrical portion 20ª thereof engages a collar 22 which is secured to the mast by a bolt 23. The collar 22 is provided with lugs 22ª to engage opposite sides of the head of the bolt 23 and prevent turning thereof. The upper brake mast 20 is provided with a portion 20ᵇ having a square or other rectangular cross-section below the cylindrical portion 20ª, and this part 20ᵇ is adapted to fit a similar non-circular aperture in the hub of a ratchet wheel 24 which rests upon the plate 15 of the housing within the bracket 18 and is adapted to be engaged by a detent 25. A flange or bracket 26 extends upwardly from the plate 15 of the housing and is provided with an aperture through which the detent 25 extends. A headless pin 27 extends through the aperture in the flange 26 and through similar apertures in the detent and in the plate 15 of the housing, as illustrated in Fig. 3, the pin being held in position by a transverse cotter pin or the like 28, which engages apertures in the pin, and in the cylindrical flange 29 carried by the lug 26. The detent 25 is provided with two similar arms having angular extremities 25ᵃ, one extremity being adapted to coact with the teeth of the ratchet wheel while the other extremity may be engaged by an operating member for the purpose of passing the detent into and out of engagement with the ratchet wheel. The collar 22 which is secured to the brake mast rests upon the ratchet wheel 24 and supports the brake mast in position within the housing.

The portion 20ᵇ of the upper brake mast extends through an aperture in the plate 15 of the housing, and the lower part thereof engages a square or other non-circular aperture in a central driving pinion 30. This pinion meshes with two other pinions 31 which are located on opposite sides of the pinion 30 and journaled on the downwardly extending trunnions 32 formed integrally with the plate 15 of the housing. These pinions 31 mesh with the teeth of an internal annular gear 33 which is mounted within the posts 16 of the housing. This gear 33 has an upwardly extending flange 33ᵃ which forms the teeth of the gear, and this flange is carried by the horizontal base plate 33ᵇ, which is formed integrally with the hub 33ᶜ having a part 33ᵈ which is journaled in a suitable aperture in the supporting plate 13. The upper brake mast 20 is provided with a cylindrical portion 20ᶜ of reduced diameter at its lower end which is journaled in a suitable aperture in the hub 33ᶜ. The lower portion of the hub 33ᶜ is provided with a square or other non-circular bore or recess adapted to be engaged by the squared upper extremity 35ᵃ of the lower brake mast 35. The lower brake mast 35 and the hub of the gear 33 are located outwardly from the end sill of the car, as illustrated in Figs. 1 and 2, and the mast 35 extends downwardly and terminates in a reduced portion 35ᵇ which is journaled in the horizontal plate 36ᵃ of a footstep 36, which is riveted or otherwise secured to the channel beam 10ᵃ of the end sill. The shoulder formed at the upper end of the reduced portion 35ᵇ serves to maintain the lower brake mast 35 in its proper position. The mast 35 is provided with an aperture 37 below the end sill to permit connection therewith of the chain or other flexible element which is connected to the brake mechanism and adapted to be wound on the mast or shaft when the upper mast is rotated by operation of the hand wheel 21. A supporting member 38 of angular form is riveted to the end sill, and the horizontal portion thereof extends outwardly and is provided with a curved recess adapted to form a thrust bearing for the lower brake mast 35 at the lower edge of the end sill in order to take up the thrust longitudinally of the car which is produced by the tension in the brake chain.

In the operation of this device, the rotation of the upper brake mast 20 operates the driving pinion 30 which in turn drives the two pinions 31 located on opposite sides thereof. The driving force of the pinion 30 is thus equally distributed to the oppositely located pinions 31, thereby preventing a tendency to produce a lateral thrust or reaction upon the upper brake mast 20. The small pinions 31 meshing with the large gear 33 drive the latter gear at a reduced speed, but with an increased power, as compared with the power applied to the mast 20, and this gear, having a driving connection with the lower brake mast 35, operates the mast 35 and thereby actuates the brake mechanism. When the brakes have been operated, the detent 25 may be moved into engagement with the ratchet wheel 24 to prevent reverse rotation of the upper brake mast and of the lower brake mast geared thereto. In hand brake mechanism, as heretofore constructed, the weight of the chain on the lower part of the mast has been such as to require all of the energy of the operator to wind up the chain with no reserve force to be applied for the operation of the brakes, but this difficulty is overcome in the present invention by providing means whereby an increased angular movement of the upper portion of the brake mast will result in the application of a greater force to the lower portion of the brake mast upon which the chain is wound. Owing to the arrangement of the driving pinions, this desirable result is accomplished without producing any lateral thrusts upon the intermediate part of the brake masts or upon the supporting structure which contains the intermediate gears. An important advantage of the invention is that the parts may be readily removed or disassembled and are simple and rugged in construction, so that they cannot easily become damaged or out of repair.

Although I have shown and described a single embodiment of the invention for purposes of illustration, it will be understood that it may be constructed in various different forms without departing from the scope of the invention as defined in the appended claims.

What I claim is:

1. The combination in railway brake mechanism, of a horizontal supporting plate, a frame member carried by said plate, an upper brake mast journaled in said frame member, a ratchet wheel seated on said frame member and having a non-rotatable engagement with said mast, a collar secured to said mast and resting on said ratchet wheel, a lower mast extending downwardly from said plate, and gearing mechanism mounted above said plate for operatively connecting said brake masts.

2. The combination in railway brake mechanism, of a horizontal plate adapted to be secured to the end sill of a car, a housing carried by said plate, a bracket carried by said housing, a bearing supported by said bracket, an upper brake mast journaled in said bearing, a ratchet wheel mounted on said brake mast below said bearing, a detent pivoted on said housing and adapted to engage said ratchet wheel, gearing mechanism mounted in said housing for stepping down the speed of said upper brake mast, and a lower brake mast driven by said gearing mechanism.

3. The combination in a railway brake mechanism of a horizontal plate adapted to be secured to the end sill of the car, a housing carried by said plate, a bearing carried by said housing, an upper brake mast extending through said bearing and into said housing, a ratchet wheel mounted on said brake mast below said bearing, a detent pivoted to said housing and adapted to engage said ratchet wheel, gearing mechanism mounted in said housing for stepping down the speed of said upper brake mast section, and a lower brake mast driven by said gearing mechanism.

4. In railway brake mechanism, a brake mast, speed reduction gearing operatively connected thereto, a ratchet wheel carried by said mast, a detent adapted to engage said ratchet wheel, a plate for supporting all of said aforementioned elements, said plate being adapted to be secured to the end sill of a car and to project therefrom, and a brake drum below said plate and driven by said gearing.

In testimony whereof I have subscribed my name.

EDWARD POSSON.